United States Patent [19]

Kotake

[11] Patent Number: 4,951,710
[45] Date of Patent: Aug. 28, 1990

[54] PIPE COUPLING
[75] Inventor: Naoyuki Kotake, Tokyo, Japan
[73] Assignee: Nitto Kohki Co., Ltd., Tokyo, Japan
[21] Appl. No.: 403,441
[22] Filed: Sep. 6, 1989
[30] Foreign Application Priority Data Sep. 14, 1988 [JP] Japan .................... 63-120705[U]

[51] Int. Cl.⁵ ........................................ F16L 37/28
[52] U.S. Cl. ............................ 137/614; 137/614.04; 251/356
[58] Field of Search .................. 137/514.04, 614; 251/149.1, 149.6, 356

[56] References Cited

U.S. PATENT DOCUMENTS 4,137,955 2/1979 Carlson ................... 137/614.04
4,421,296 12/1983 Stephens ................. 251/149.6
4,700,744 10/1987 Rutter et al. ............ 137/614.04

Primary Examiner—A. Michael Chambers
Attorney, Agent, or Firm—Nixon & Vanderhye

[57] ABSTRACT

A pipe coupling comprising a cylindrical body having a fluid passage and a valve for opening and closing the fluid passage, in which the valve has a head portion and a cylinder portion, both made of chemicals-resistant polymers, and the cylinder portion has a plurality of holes penetrating the cylinder wall in the diametrical directions, the holes being formed alternately in the positions shifted in the circumferential direction and the axial direction of the cylinder portion, resulting in that the cylinder portion has elasticity in the axial direction.

2 Claims, 2 Drawing Sheets

PIPE COUPLING

BACKGROUND OF THE INVENTION

1. Field of the Invention

This invention relates to a high chemicals-resistant pipe coupling to be connected to a pipe for transferring a fluid.

2. Description of the Related Art

Conventionally, the coupling of pipes is provided with a spring for applying pressure to a valve. For example, a coil spring made of fluorine-contained polymers having a high resistivity for chemicals, a metal spring coated with such polymers, or a bellows-like spring is employed.

However, since the coil spring made of fluorine-contained polymers has a very small modulus of transverse elasticity, it cannot stand as great a load as a metal spring. The metal spring coated by fluorine-contained polymers cannot sufficiently be protected, because pin holes are easily formed in the coating. In a case where a bellows-like spring is used, since the fluid passage is narrowed when the spring is compressed, it is necessary to design the spring in consideration of an inner diameter of the bellows in its compressed state.

SUMMARY OF THE INVENTION

It is accordingly the object of the present invention is to provide a pipe coupling which comprises a resin spring having elasticity as great as a metal spring, which is resistive to corrosion by chemicals, and in which the diameter of the fluid passage does not changed.

The pipe coupling of the present invention comprises a cylindrical body having a fluid passage and a valve for opening and closing the passage, wherein the valve has a head portion and a cylinder portion, the cylinder portion has a plurality of holes which penetrate the cylinder wall in diametrical directions. The holes are formed in positions alternately shifted in the circumferential direction and the axial direction of the cylinder portion, and thus the cylinder portion has elasticity in the axial direction.

According to this invention, when a socket and a plug of the coupling are connected, pressure is applied to the valve so as to move it backward. At this time, the cylinder portion is compressed in the axial direction so that the configuration of the holes is curved at the middle portion like a concave shape, and the fluid passage opens. When the socket and the plug are separated, the valve is released from the pressure, and the configuration of the holes returns to the original shape. As a result, the valve is pressed forward due to the recovering force of the cylinder portion, thereby closing the fluid passage.

Since the above-described valve of the present invention is made of chemical-resistant polymers and has elasticity in the axial direction of the cylinder portion, it is advantageous over the conventional valve having a coil spring made of metal. First of all, the closing of the valve is maintained at a high level, even if the socket and the plug are repeatedly connected and disconnected a number of times. In addition, elasticity can be easily modified only by changing the thickness of the cylinder wall, the configuration of the holes, and the number of the holes, without changing the diameter of the cylindrical body. Furthermore, since the valve is made of polymers resistant to chemicals, and is not damaged by chemicals unlike the metal spring, the present invention is applicable to various cases in a wider range of industrial fields than the conventional coupling.

DETAILED DESCRIPTION OF THE PREFERRED EMBODIMENTS

Figure 1:
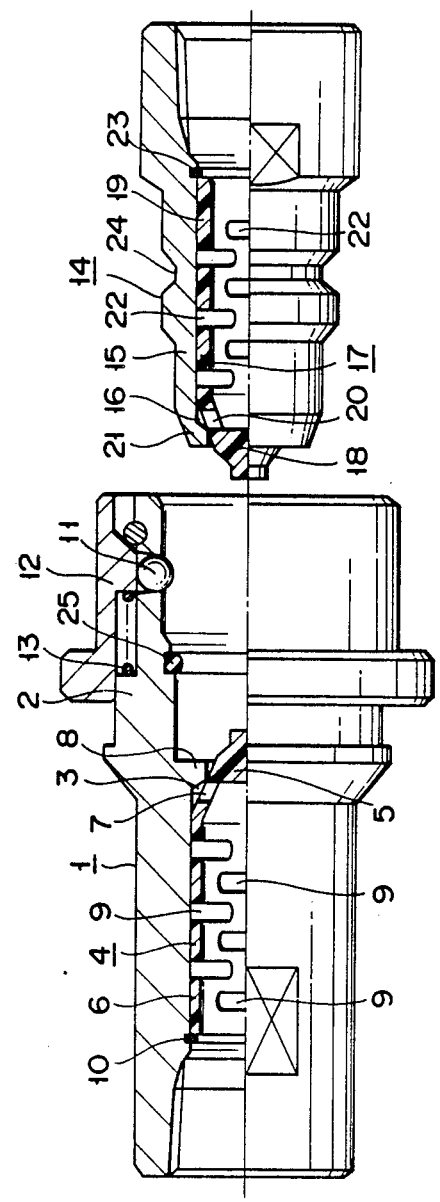
FIG. 1 is a partially longitudinal sectional view of a pipe coupling according to an embodiment of the present invention.
Figure 2:
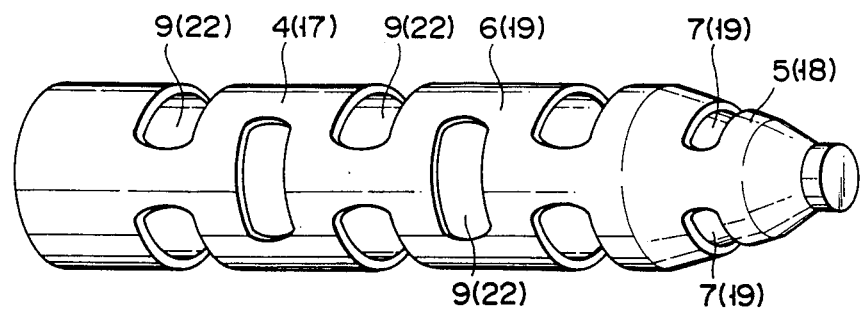
FIG. 2 is an enlarged perspective view of a valve shown in FIG. 1.

Referring to the accompanying drawings, embodiments of the present invention will be described below in detail; however, this invention is not limited to those embodiments.

In the drawings, numeral 1 denotes a socket. Socket 1 comprises cylindrical body 2, in which fluid passage 3 is formed. Numeral 4 denotes a valve for opening and closing fluid passage 3 in cylindrical body 2. Valve 4 comprises head portion 5 and cylinder portion 6, both made of chemical-resistant polymers. Numeral 7 denotes a fluid flowing hole provided in head portion 5 on the side of cylinder portion 6. Numeral 8 denotes a valve sheet formed in fluid passage 3 on cylindrical body 2. When head portion 5 of valve 4 is in contact with valve sheet 8, fluid passage 3 is closed.

Figure 3:
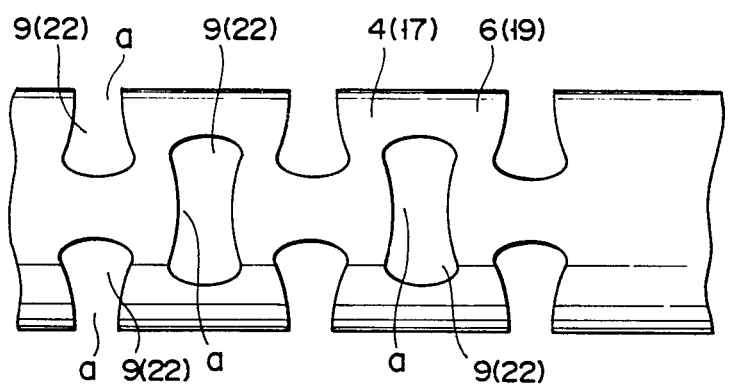
FIG. 3 shows a state in which the cylinder portion of the valve is compressed in the axial direction.

In cylinder portion 6, a plurality of oblong through holes 9 are formed so as to penetrate the cylinder wall in diametrical directions, alternately shifting their positions in the circumferential direction and axial direction. Because of this structure, cylinder portion 6 has elasticity in the axial direction. In this embodiment, even-numbered holes 9 and odd-numbered holes 9 are formed in cylinder portion 6, shifted each other at an angle of 90° in the circumferential direction. When pressure is applied to cylinder portion 6 in the axial direction, the configuration of hole 9 is curved at the middle portion (a) like a concave shape as shown in FIG. 3, and cylinder portion 6 is compressed in accordance with a change of the configuration of hole 9. On the other hand, when cylinder portion is released from the pressure, the configuration of hole 9 returns to the original shape. Cylinder portion 6 is thus elastic because of the recovery forth of holes 9.

When socket 1 is separated from the plug, head portion 5 of valve 4 as described above is in contact with valve sheet 8 and the distal end of cylinder portion 6 is in contact with stop ring 10 provided in fluid passage 3 of cylindrical body 2.

Reference numeral 11 denotes a lock ball which is to be engaged with a groove (to be described later) formed in the outer surface of the plug; 12, a sleeve for pressing lock ball 11; and 13, a spring for urging sleeve 12.

Reference numeral 14 denotes a plug comprising cylindrical body 15, in which fluid passage 16 is formed. Numeral 17 denotes a valve for opening and closing fluid passage 16 in cylindrical body 15. Like valve 4 in socket 1, valve 17 also comprises head portion 18 and cylinder portion 19, both made of chemicals-resistant polymers. Fluid flowing hole 20 is provided in head portion 18 on the side of cylinder portion 19. When head portion 18 of valve 17 is in contact with valve sheet 21, fluid passage 16 in cylindrical body 15 is closed.

In cylinder portion 19, a plurality of oblong through holes 22 are formed so as to penetrate the cylinder wall in diametrical directions. The positions of the holes are shifted alternately in the circumferential direction and axial direction. Because of this structure, cylinder portion 19 has elasticity in the axial direction. When pressure is applied to cylinder portion 19 in the axial direction, the configuration of hole 22 is curved at the middle portion (a) like a concave shape as shown in FIG. 3, and cylinder portion 19 is compressed in accordance with a change of the configuration of hole 22. On the other hand, when cylinder portion 19 is released from the pressure, the configuration of hole 22 returns to the original shape. Cylinder portion 19 is thus elastic due to the recovery forth of holes 22.

When plug 4 thus arranged is separated from socket 1, head portion 18 of valve 17 is in contact with valve sheet 21 and the distal end of cylinder portion 19 is in contact with stop ring 23 provided in fluid passage 16 of cylindrical body 16.

When socket 1 and plug 14 is connected, valve 4 of socket 1 and valve 17 of plug 14 are mutually pressed. At this time, holes 9 and 22 formed in cylinder portions 6 and 19 are compressed in the axial directions into a concave shape as shown in FIG. 3, and head portions 5 and 18 are pressed backward. As a result, head portions 5 and 18 are separated from valve sheets 8 and 21, respectively, and thus fluid passages 3 and 16 are connected to each other.

Reference numeral 24 denotes an engaging groove formed in the outer surface of plug 14. When socket 1 and plug 14 are coupled, lock ball 11 is engaged with engaging groove 24. This engagement of lock ball 11 with engaging groove 24 is maintained until sleeve 12 of socket 1 is operated. Reference numeral 25 denotes a seal ring.

What is claimed is:

1. A pipe coupling comprising a cylindrical body extending in an axial direction and having a fluid passage and valve means for opening and closing the fluid passage;

said valve means having a head portion and a cylinder portion;

said cylinder portion having a plurality of slots extending in a circumferential direction of said cylinder portion and penetrating said cylinder portion in radial directions, said slots being formed alternately in positions shifted in the circumferential direction and in the axial direction of the cylinder portion, such that said cylinder portion is provided with elasticity in the axial direction.

2. The pipe coupling according to claim 1, wherein said valve is formed of a chemical-resistant resin.

* * * * *